US010805237B2

(12) United States Patent
Dettori et al.

(10) Patent No.: US 10,805,237 B2
(45) Date of Patent: Oct. 13, 2020

(54) QUOTA MANAGEMENT PROTOCOL FOR SHARED COMPUTING SYSTEMS

(71) Applicant: International Business Machines Corporation, Armonk, NY (US)

(72) Inventors: Paolo Dettori, Hartsdale, NY (US); Hai Huang, Danbury, CT (US); Ali Kanso, Elmsford, NY (US); Mariusz Sabath, Ridgefield, CT (US); Michael Joseph Spreitzer, Cronton-On-Hudson, NY (US); Alaa Salah Youssef, Valhalla, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/522,795

(22) Filed: Jul. 26, 2019

(65) Prior Publication Data

US 2019/0349315 A1    Nov. 14, 2019

Related U.S. Application Data

(63) Continuation of application No. 15/289,677, filed on Oct. 10, 2016, now Pat. No. 10,491,541.

(51) Int. Cl.
   *H04L 12/911* (2013.01)

(52) U.S. Cl.
   CPC .................. *H04L 47/82* (2013.01)

(58) Field of Classification Search
   CPC ..................................................... H04L 47/82
   See application file for complete search history.

(56) References Cited

U.S. PATENT DOCUMENTS

| 7,716,275 | B1 | 5/2010 | Nagaralu et al. |
| 8,711,721 | B2 | 4/2014 | Smith et al. |
| 9,058,198 | B2 | 6/2015 | McGrath et al. |
| 9,336,061 | B2 | 5/2016 | Beaty et al. |
| 2013/0097680 | A1 | 4/2013 | Bendapudi et al. |
| 2013/0303114 | A1 | 11/2013 | Ahmad et al. |
| 2014/0068624 | A1 | 3/2014 | Fuller et al. |
| 2014/0095693 | A1 | 4/2014 | Apte et al. |
| 2014/0289412 | A1 | 9/2014 | Doddavula et al. |
| 2015/0033224 | A1 | 1/2015 | Maheshwari et al. |
| 2015/0372881 | A1 | 12/2015 | Bellomo et al. |

(Continued)

OTHER PUBLICATIONS

Behl et al., "DQMP: A Decentralized Protocol to Enforce Global Quotas in Cloud Environments", Proceedings of the 14th International Symposium on Stabilization, Safety, and Security of Distributed Systems, 2012, 14 pages.

(Continued)

*Primary Examiner* — Austin J Moreau
(74) *Attorney, Agent, or Firm* — Amin, Turocy & Watson, LLP

(57) ABSTRACT

Techniques are provided for automated employment of respective quota managers for framework instances, where the respective quota managers can negotiate amongst themselves to manage usage of a resource of a shared computing system in relation to a quota for the resource for a tenant of the shared computing system. This can allow tenants to share their quota among multiple frameworks, enable quota exchange between multiple frameworks, and choose a quota with a minimum costs, and thus maximize savings.

20 Claims, 10 Drawing Sheets

(56) References Cited

U.S. PATENT DOCUMENTS

2016/0044702 A1    2/2016    Centonza et al.

OTHER PUBLICATIONS

Lakew, Ewnetu Bayuh, "Autonomous Cloud Resource Provisioning: Accounting, Allocation, and Performance Control", PHD Thesis, Department of Computing Science, UMEA University, Sep. 2015, 51 pages.

Lakew et al., "A Tree-based Protocol for Enforcing Quotas in Clouds", IEEE 10th World Congress on Services, 2014, pp. 279-286.

Non-Final Office Action received for U.S. Appl. No. 15/289,677 dated Feb. 26, 2019, 28 pages.

List of IBM Patents or Applications Treated as Related.

US 10,805,237 B2

QUOTA MANAGEMENT PROTOCOL FOR SHARED COMPUTING SYSTEMS

BACKGROUND

The subject disclosure relates to managing quota of a resource in a shared computing system.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatus and/or computer program products that facilitate managing quota of a resource in a cloud computing system are described.

According to an embodiment, a system is provided. The system comprises a memory that stores computer executable components; and a processor that executes the computer executable components stored in the memory. The computer executable components can comprise a plurality of application component instances associated with a tenant, wherein the tenant is assigned a quota associated with a resource of the system; a plurality of framework instances comprising respective quota managers, and respective application instances are associated with framework instances; and in response to a first framework instance of the plurality of framework instances using a threshold amount of a first sub-quota of the quota assigned to the first framework, a first quota manager associated with the first framework instance: sends respective first messages to second quota managers associated with second framework instances of the plurality of framework instances, wherein the respective first messages comprise first requests specifying requestor information comprising a requested quota amount to reallocate to the first framework instance, and receives from at least one of the second quota managers respective second messages comprising requestee information comprising offered quota amounts to the first framework instance.

In another embodiment a computer-implemented method is provided. The computer-implemented method can comprise determining, by a system including a processor via a requestor quota manager, that a usage amount of a resource associated with the requestor quota manager exceeds a threshold; determining, by the system via the requestor quota manager, requestor information comprising a requested quota amount associated with a resource; and sending, by the system via the requestor quota manager, respective inquiry request messages to requestee quota managers, wherein the respective inquiry request messages comprise the requestor information.

In another embodiment, a computer program product for managing quota of a resource for a tenant of a shared computing system is provided. The computer program product can comprise a computer readable storage medium having program instructions embodied therewith. The program instructions can be executable to receive, via a requestor quota manager, an inquiry request message from a requestee quota manager, wherein the inquiry request message comprises requestor information comprising a requested quota amount associated with a resource; determine, via the requestee quota manager, requestee information comprising an offered quota amount associated with a resource; and send, via the requestee quota manager, an update message to the requestor quota manager, wherein the update message comprises the requestee information.

DETAILED DESCRIPTION

Figure 1:
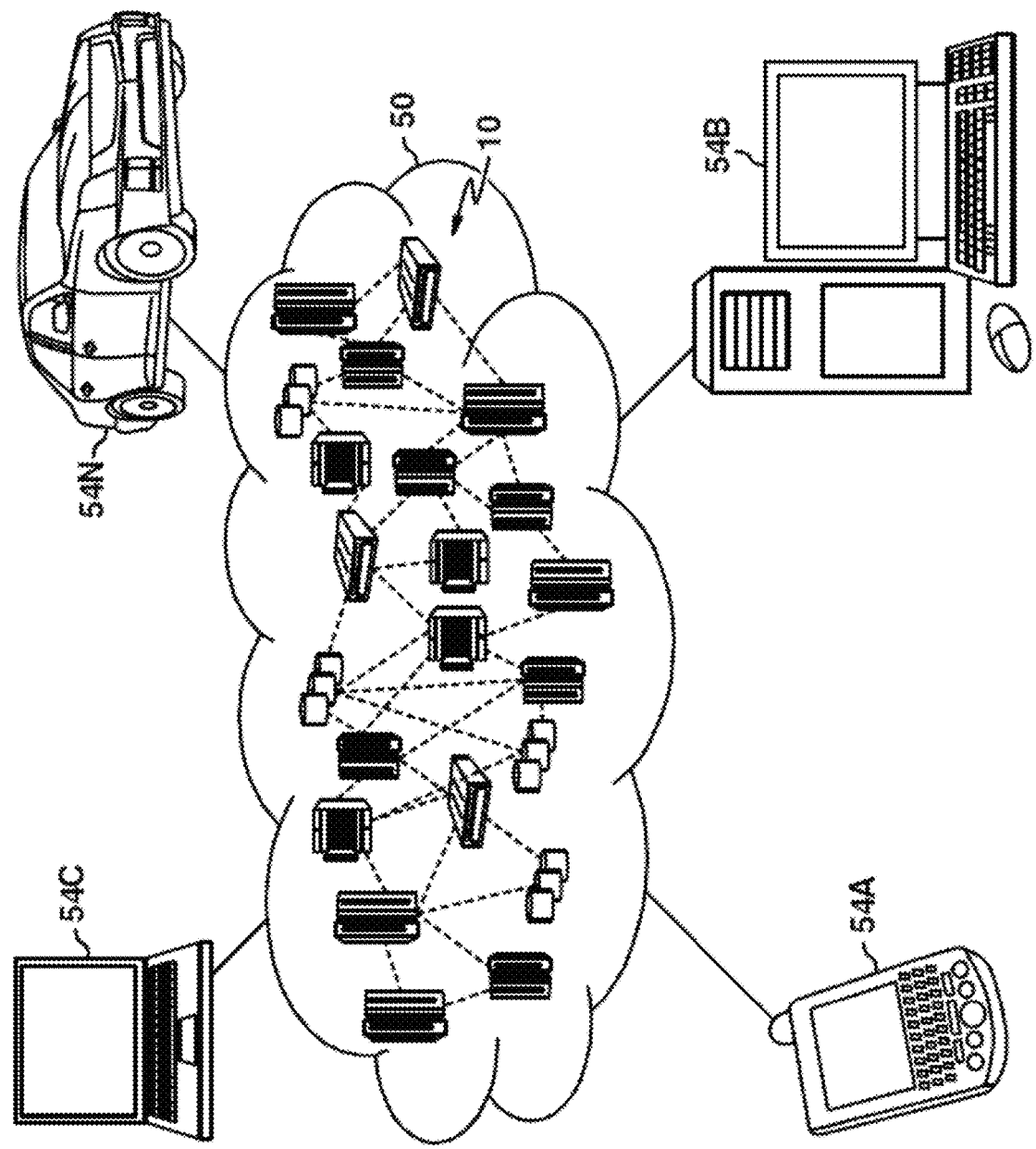
FIG. 1 illustrates a block diagram of an example, non-limiting cloud computing environment in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident; however in various cases, that the one or more embodiments can be practiced without these specific details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, an illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
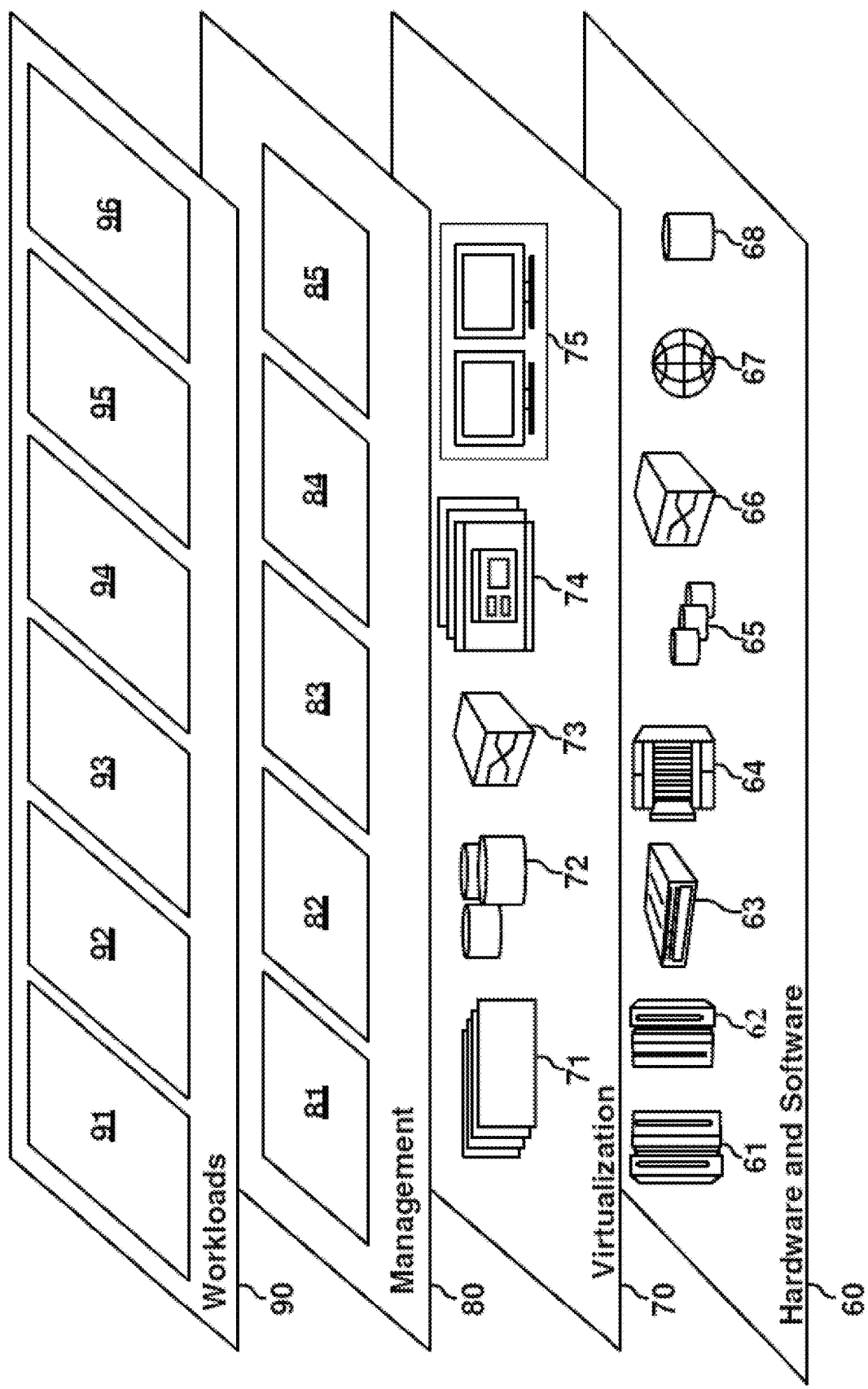
FIG. 2 illustrates a block diagram of example, non-limiting abstraction model layers in accordance with one or more embodiments described herein.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Non-limiting examples of workloads and functions which may be provided from this layer include: mapping and navigation 91; software development and lifecycle management 92; virtual classroom education delivery 93; data analytics processing 94; transaction processing 95; and mobile desktop 96.

A cloud system (e.g., a cloud computing system, a shared computing system, a multi-tenant computing system) can concurrently host a plurality of tenants (e.g., user, business, government agency, or any other suitable entity) that deploy applications that share one or more resources (e.g., processing, memory, storage, network bandwidth, containers, volumes, printing, scanning, cameras, faxing, telephoning, or any other suitable shared resource) of the cloud system. A tenant can be an entity that is employing the cloud system to run an application, such as in a non-limiting example, to provide a service (e.g., video games, social network, order management, order fulfillment, web store, or any other suitable service) to the tenant's clients, to perform an application function (e.g., data analytics, accounting, or any other suitable application function) for the tenant, or any other suitable application that can be executed on a cloud system. An application can have application component (e.g., front end, back end, database, data mining, or any other suitable component of an application). A tenant can deploy an application on one or more zones (e.g., availability zone, security zone, shard, data center, computing cluster, geographic region, or any other suitable zone) of the cloud system where respective instances of the application are executed and use the one or more resources. Each zone (or, in some embodiments, one or more zones) can have framework instances of frameworks (e.g., of one or more framework types) that run application component instances of the application instance.

Each tenant (or, in some embodiments, one or more tenants) can have a quota (e.g., an amount of the resource per time period) for a resource of the cloud system, for example, so that one tenant does not exhaust the resource and prevent other tenants from employing the resource. It is to be appreciated that the quota can be in any suitable unit of measure that is appropriate for the resource. In a non-limiting example, a processing resource can have a unit of measure for quota of processing cycles for hour, minutes of processing time per hour, or any other suitable unit of measure for a processing quota. In another non-limiting example, network bandwidth can have a unit of measure of megabytes per hour, gigabytes per month, or any other suitable unit of measure for a network bandwidth quota.

The quota can be provided for free by the cloud system and/or on a fee basis. For example, the cloud system can provide an amount of storage space for free. In another example, the cloud system can charge on-demand pricing that has a fee per a unit of storage space. In a further example, the cloud system can charge pre-paid pricing that has a fee for an amount of storage space, which when exceed has an on-demand pricing for the excess storage used. In another example, the cloud system can provide an amount of storage space for free, which when exceed has an on-demand pricing for the excess storage used. In another example, a tenant can define a quota that they do not want to exceed and get charge on the actual usage of the resource. The cloud system and/or tenant can employ any suitable pricing mechanism for determining a tenant quota for a resource. It can be important for tenants to stay within their quota for a resource to better manage their costs.

Challenges of managing quota of a resource in a cloud system can include, but is not limited to, complexity due to the need, in some instances, to incorporate the quota management functions of various framework types of framework instances; additional communication due to a central quota manager and framework instances, for example, exchanging information more frequently in order for the central quota manager to keep abreast of resource usage and communicate decisions to the framework instances; and/or a central quota manager being a single point of failure for management of one or more quotas for one or more resources of the cloud system. To address the challenges in managing quota of a resource in a cloud system as described herein, one or more exemplary embodiments of the invention provide respective quota managers for framework instances, where the respective quota managers can negotiate amongst themselves to manage usage of a resource in relation to a quota for the resource for a tenant. Each framework instance (or, in some embodiments, one or more framework instances) can be assigned a sub-quota from the quota for the resource for the tenant. When a framework instance reaches a threshold remaining amount of the sub-quota, a quota manager associated with the framework instance can negotiate with quota managers associated with the other framework instances to reallocate (e.g., release) one or more portions of their sub-quotas of the resource to the framework instance. In this manner, each quota manager (or, in some embodiments, one or more quota managers) will only need to communicate with the other quota managers when they have reached the threshold remaining amount of their sub-quota, which minimizes communication. Furthermore, since each quota manager manages the sub-quota for the associated framework instance, there is not a single point of failure in relation to managing the quota of the resource. Additionally, some framework types have existing framework quota managers which can be leveraged, for example, by modification or a code wrapper, to implement the quota manager functionality described herein.

One or more embodiments of the subject disclosure is directed to computer processing systems, computer-implemented methods, apparatus and/or computer program products that facilitate efficiently, effectively, and automatically (e.g., without direct human involvement) manage quota of a resource in a cloud system. The computer processing systems, computer-implemented methods, apparatus and/or computer program products can employ hardware and/or software to solve problems that are highly technical in nature (e.g., manage quota of a resource in a cloud system) that are not abstract and that cannot be performed as a set of mental acts by a human. For example, a human, or even thousands of humans, cannot efficiently, accurately and effectively manually manage quota of a resource in a cloud system in a live environment. One or more embodiments of the subject computer processing systems, methods, apparatuses and/or computer program products can enable the automated management of quota of a resource in a cloud system in a highly accurate and efficient manner. Moreover, by employing automated management of quota of a resource in a cloud system using respective quota managers for framework instances, communication can be reduced, thus reducing processing requirements, network bandwidth requirements, memory requirements, and storage requirements associated with cloud systems. Further, one or more embodiments of the subject techniques can facilitate limited failure impact as a result of a quota manager associated with a framework instance failing, as the other quota managers associated with the other framework instances can continue to operate. In addition, one or more embodiments can leverage existing framework quota managers to implement the quota manager functionality described herein.

Figure 3:
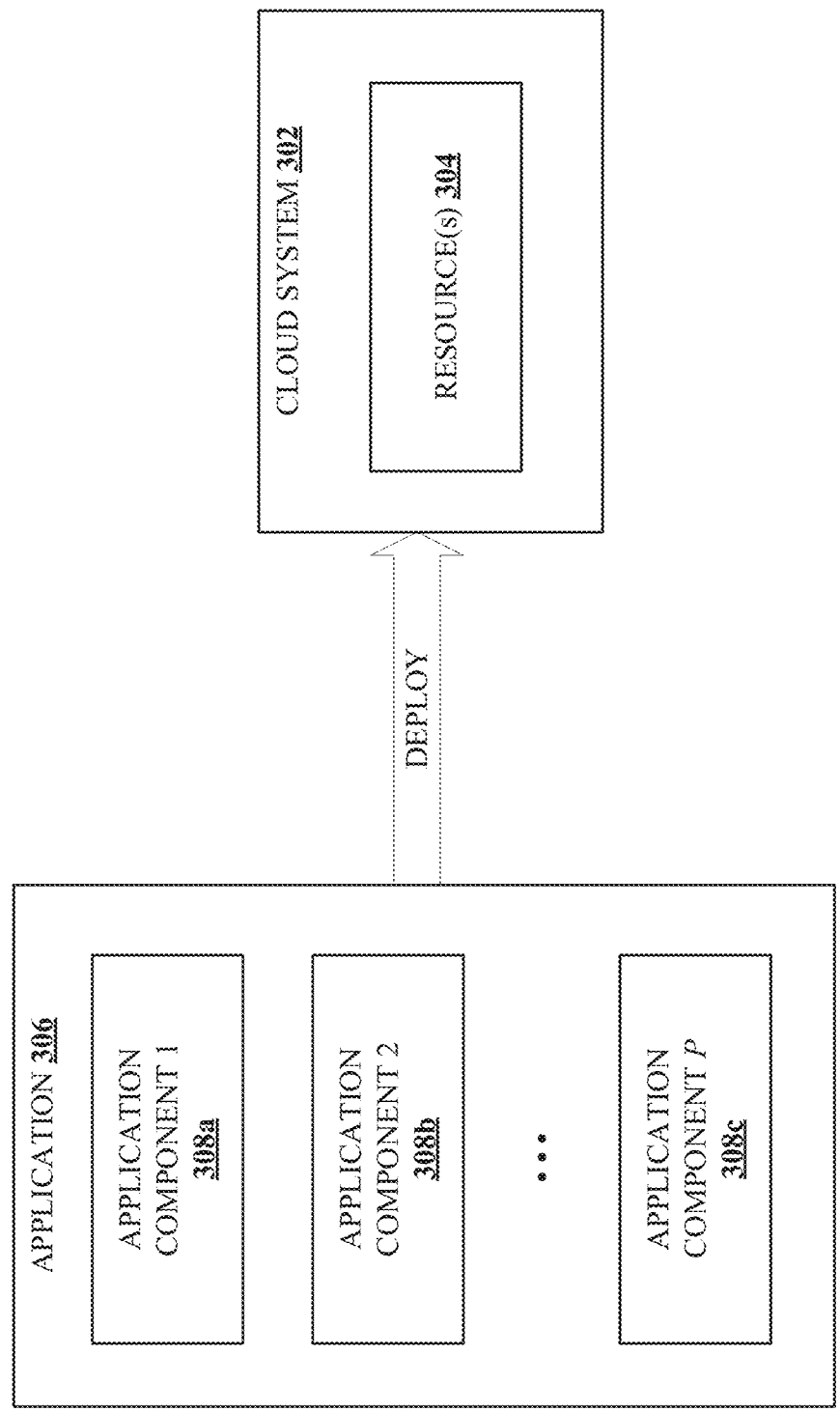
FIG. 3 illustrates a block diagram of an example, non-limiting application that can be deployed by a tenant on a non-limiting cloud system in accordance with one or more embodiments described herein.

FIG. 3 illustrates a block diagram of an example, non-limiting application 306 that can be deployed by a tenant on a non-limiting cloud system 302 in accordance with one or more embodiments described herein. Aspects of systems (e.g., cloud system 302 and the like), apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. Repetitive description of like elements employed in one or more embodiments described herein is omitted for sake of brevity.

As shown in FIG. 3, application 306 can include one or more application components (e.g., front end, back end, database, data mining, or any other suitable component of an application), for example, application component1 308a, application component2 308b, . . . application componentP 308c, where P is any suitable positive integer representing the quantity of application components in application 306. Cloud system 302 can have one or more resources 304 (e.g., processing, memory, storage, network bandwidth, containers, volumes, printing, scanning, cameras, faxing, telephoning, or any other suitable shared resource) to be shared amongst tenants of cloud system 302. Application components can be assigned respective priorities indicative of the relative importance with respect allocation of a resource 304 to application component instances of the application components. The respective priorities can be assigned to the application components by the tenant, the cloud computing system, or any other suitable entity. The priority assigned to an application component can be propagated to an application component instance of the application component.

Figure 4:
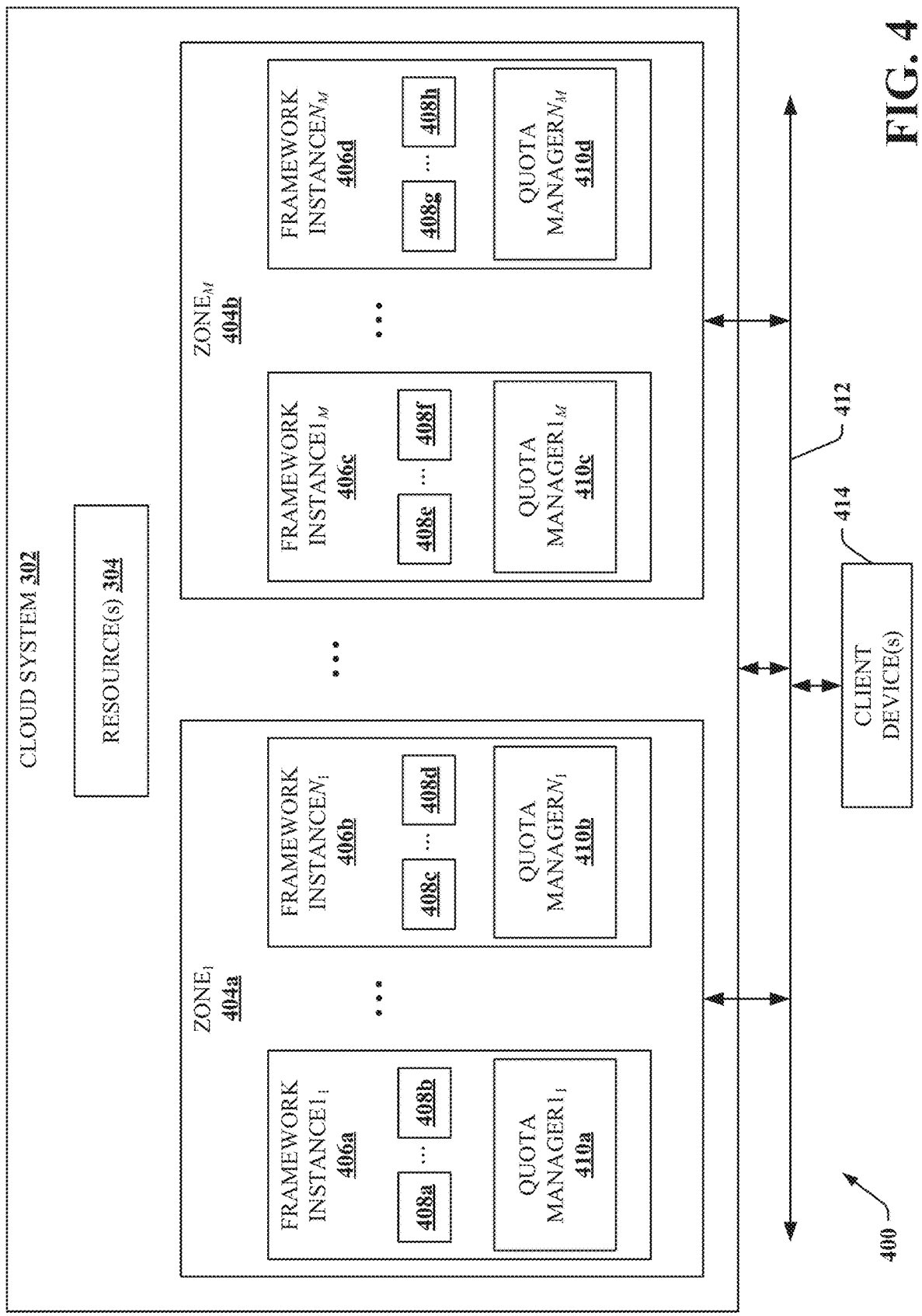
FIG. 4 illustrates a block diagram of an example, non-limiting cloud computing environment in accordance with one or more embodiments described herein.

FIG. 4 illustrates a block diagram of an example, non-limiting cloud computing environment 400 in accordance with one or more embodiments described herein. cloud computing environment 400 can include a cloud system 302, one or more networks 412 and one or more client devices 414. Client devices 414 can interact with cloud system 302 over networks 412. Cloud system 302 can include resources 304 that are distributed across one or more applications zones, for example, zone$_1$ 404a . . . zone$_M$ 404b, where M is a positive integer representing any suitable quantity of zones implemented in cloud system 302. In an example, zones can mirror resources 304. In another example, different zones can have different quantities and types of resources 304. For example, zones can have different amounts of storage capacity, or different types of processing systems.

Each zone can include one or more framework instances. For example, zone$_1$ 404a can include framework instance 1$_1$ 406a . . . framework instance N$_1$ 406b, and zone$_1$ 404a can include framework instance 1$_M$ 406c . . . framework instanceN$_M$ 406d, where N is a positive integer representing any suitable quantity of framework instances. In an example, each zone can be a mirror of each other in terms of the quantity and/or types framework instances implemented. In another example, zones can have different quantities and/or different types of framework instances. The non-limiting example depicted in FIG. 4 shows each zone being a mirror of each other in terms of the framework instances implemented. Framework types (e.g., Swarm, Docker, Kubernetes, Mesos, Fleet, Marathon, Chronos, CoreOS, DCOS, Nomad, or any other suitable framework) can be assigned respective weights indicative of the relative importance with respect allocation of a resource 304 to the framework instances of the framework types. The respective weights can be assigned to the framework types by the tenant, the cloud computing system, and/or any other suitable entity. The weight assigned to a framework type can be propagated to a framework instance of the framework type.

Application 306 can be deployed as application instances in zone$_1$ 404a . . . zone$_M$ 404b. A framework instance can execute one or more application component instances of application component1 308a, application component2 308b, . . . and/or application componentP 308c of application 306. It is to be appreciated that a framework instance can employ auto-scaling to instantiate a plurality of application component instances of an application component in the framework instance. Auto-scaling can cause increases and/or decreases in usage of resources by application component instances as they are initiated and/or terminated. Furthermore, changes in workload for application component instances can cause increases and/or decreases of usage of resources. For example, framework instance 1$_1$ 406a can include one or more application component instances 408a . . . 408b associated with at least one of application component1 308a, application component2 308b, . . . and/or application componentP 308c. Framework instanceN$_1$ 406b can include one or more application component instances 408c . . . 408d associated with at least one of application component1 308a, application component2 308b, . . . and/or application componentP 308c. Framework instance1$_M$ 406c can include one or more application component instances 408e . . . 408f associated with at least one of application component1 308a, application component2 308b, . . . and/or application componentP 308c. Framework instanceN$_M$ 406d can include one or more application component instances 408g . . . 408h associated with at least one of application component1 308a, application component2 308b, . . . and/or application componentP 308c. Furthermore, application components can be assigned or have a defined preference for a particular framework type to employ for instantiating application component instances, which can be specified by the tenant, cloud system 302, and/or any other suitable entity.

It is to be appreciated that while the example herein depicts a single application 306 deployed by the tenant, the tenant can deploy a plurality of different applications 306 on cloud system 302 that share resources 304, and application component instances 408a . . . 408h can be instances of application components from the different applications 306. In an example, each zone can be a mirror of each other in terms of the applications 306 deployed. In another example, zones can have one or more different applications 306 deployed. The deployment of the one or more applications 306 on the zones can be specified by the tenant, cloud system 302, and/or any other suitable entity.

Each framework instance can be assigned a sub-quota from the quota of a resource 304 for the tenant. For example, framework instance$1_1$ 406a can be assigned sub-quota$1_1$, framework instance$N_1$ 406b can be assigned sub-quota$N_1$, framework instance$1_M$ 406b can be assigned sub-quota$1_M$, and framework instance$N_M$ 406b can be assigned sub-quota$N_M$. The respective sub-quotas of the resource 304 can be assigned by the tentant, the cloud system 302, and/or any other suitable entity. In an example, each framework instance can be assigned an equal sub-quotas of the resource 304. In another example, different framework instance can be assigned different sub-quotas of the resource 304. In a non-limiting example, the respective sub-quotas can be based on the respective weights assigned to the framework instances. For example, the respective sub-quotas can be proportional to the respective weights.

Each framework instance can include a quota manager. For example, framework instance$1_1$ 406a can include quota manager$1_1$ 410a, framework instance$N_1$ 406b can include quota manager$N_1$ 410b, framework instance$1_M$ 406b can include quota manager$1_M$ 410c, and framework instance$N_M$ 406b can include quota manager$N_M$ 410d. Additionally, each framework instance can be assigned a threshold representative of an amount of remaining sub-quota that can trigger a quota manager associated with the framework instance to negotiate with other quota managers to potentially re-allocate respective portions of their associated other framework instance sub-quotas to the framework instance. For example, framework instance$1_1$ 406a can be assigned threshold$1_1$, framework instance$N_1$ 406b can be assigned threshold$N_1$, framework instance$1_M$ 406b can be assigned threshold$1_M$, and framework instance$N_M$ 406b can be assigned threshold$N_M$. The respective thresholds can be assigned by the tenant, the cloud system 302, and/or any other suitable entity.

Each quota manager can monitor usage of resource 304 in the associated framework instance by the associated application component instances and compare the usage against the threshold for the framework instance to determine whether to initiate negotiation with the other quota managers to potentially re-allocate respective portions of their associated other framework instance sub-quotas to the framework instance. For example, quota manager$1_1$ 410a can monitor usage$1_1$ of resource 304 in framework instance$1_1$ 406a by application component instances 408a . . . 408b and compare usage$1_1$ against threshold$1_1$, quota manager$N_1$ 410b can monitor usage$N_1$ of resource 304 in framework instance$N_1$ 406b by application component instances 408c . . . 408d and compare usage$N_1$ against threshold$N_1$, quota manager$1_M$ 410c can monitor usage$1_M$ of resource 304 in framework instance$1_M$ 406c by application component instances 408e . . . 408f and compare usage$1_M$ against threshold$1_M$, and quota manager$N_M$ 410d can monitor usage$N_M$ of resource 304 in framework instance$N_M$ 406d by application component instances 408g . . . 408h and compare usage$N_M$ against threshold$N_M$.

When a quota manager determines that the usage of resource 304 in the associated framework instance by the associated application component instances meets the threshold for the framework instance, the quota manager can initiate negotiation with the other quota managers to potentially re-allocate respective portions of their associated other framework instance sub-quotas to the framework instance, as described in more detail below.

Resources 304 can also include or otherwise be associated with at least one included memory (not shown) that stores computer executable components (e.g., computer executable components can include, but are not limited to, framework instance$1_1$ 406a . . . framework instance$N_M$ 406d, quota manager$1_1$ 410a . . . quota manager$N_M$ 410d, application component instances 408a . . . 408h, and associated components). Resources 304 can also include or otherwise be associated with at least one processor (not shown) that executes the computer executable components stored in the memory. Resources 304 can further include one or more system buses (not shown) that can couple the various components including, but not limited to, the framework instance$1_1$ 406a . . . framework instance$N_M$ 406d, quota manager$1_1$ 410a . . . quota manager$N_M$ 410d, application component instances 408a . . . 408h, memory and/or processor.

Client device 414 can be any computing device that can be communicatively coupled to cloud system 302, non-limiting examples of which can include a server computer, a computer, a mobile computer, a mainframe computer, an automated testing system, a network storage device, a communication device, a web server device, a network switching device, a network routing device, a gateway device, a network hub device, a network bridge device, a control system, or any other suitable computing device. It is to be appreciated that cloud system 302, and/or client devices 414 can be equipped with communication components (not shown) that enable communication between cloud system 302, and/or client devices 414 over one or more networks 412.

The various components (e.g., framework instance$1_1$ 406a . . . framework instance$N_M$ 406d, quota manager$1_1$ 410a . . . quota manager$N_M$ 410d, application component instances 408a . . . 408h, cloud system 302, client devices 414, resources 304, zone$_1$ 404a . . . zone$_M$ 404b, and/or other components) of cloud computing environment 400 can be connected either directly or via one or more networks 412. Such networks 412 can include wired and wireless networks, including, but not limited to, a cellular network, a wide area network (WAN) (e.g., the Internet), or a local area network (LAN), non-limiting examples of which include cellular, WAN, wireless fidelity (Wi-Fi), Wi-Max, WLAN, radio communication, microwave communication, satellite communication, optical communication, sonic communication, or any other suitable communication technology.

Figure 5:
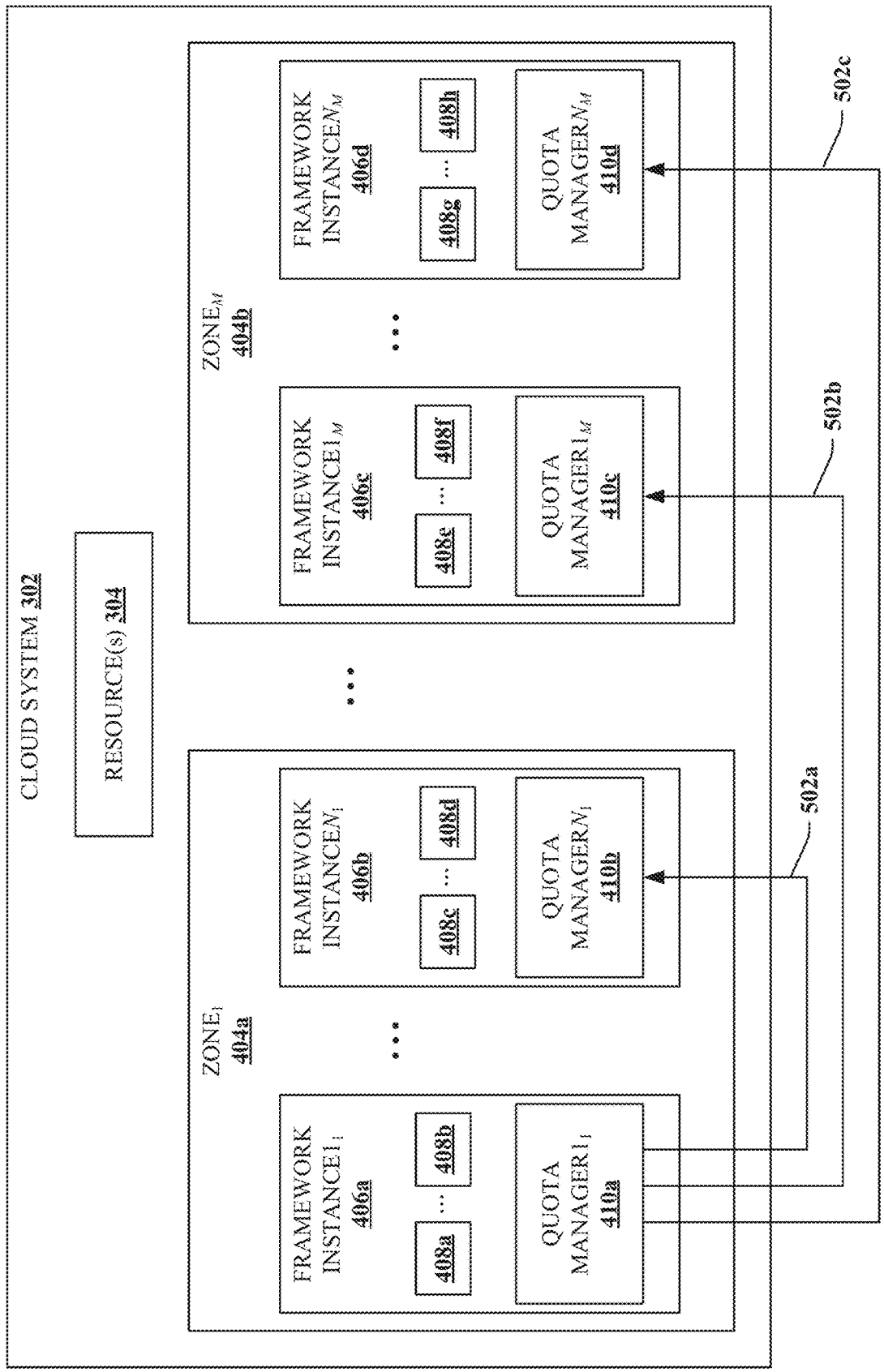
FIGS. 5, 6, and 7 illustrate block diagrams depicting example, non-limiting negotiation by a quota manager with other quota managers in accordance with one or more embodiments described herein.
Figure 6:
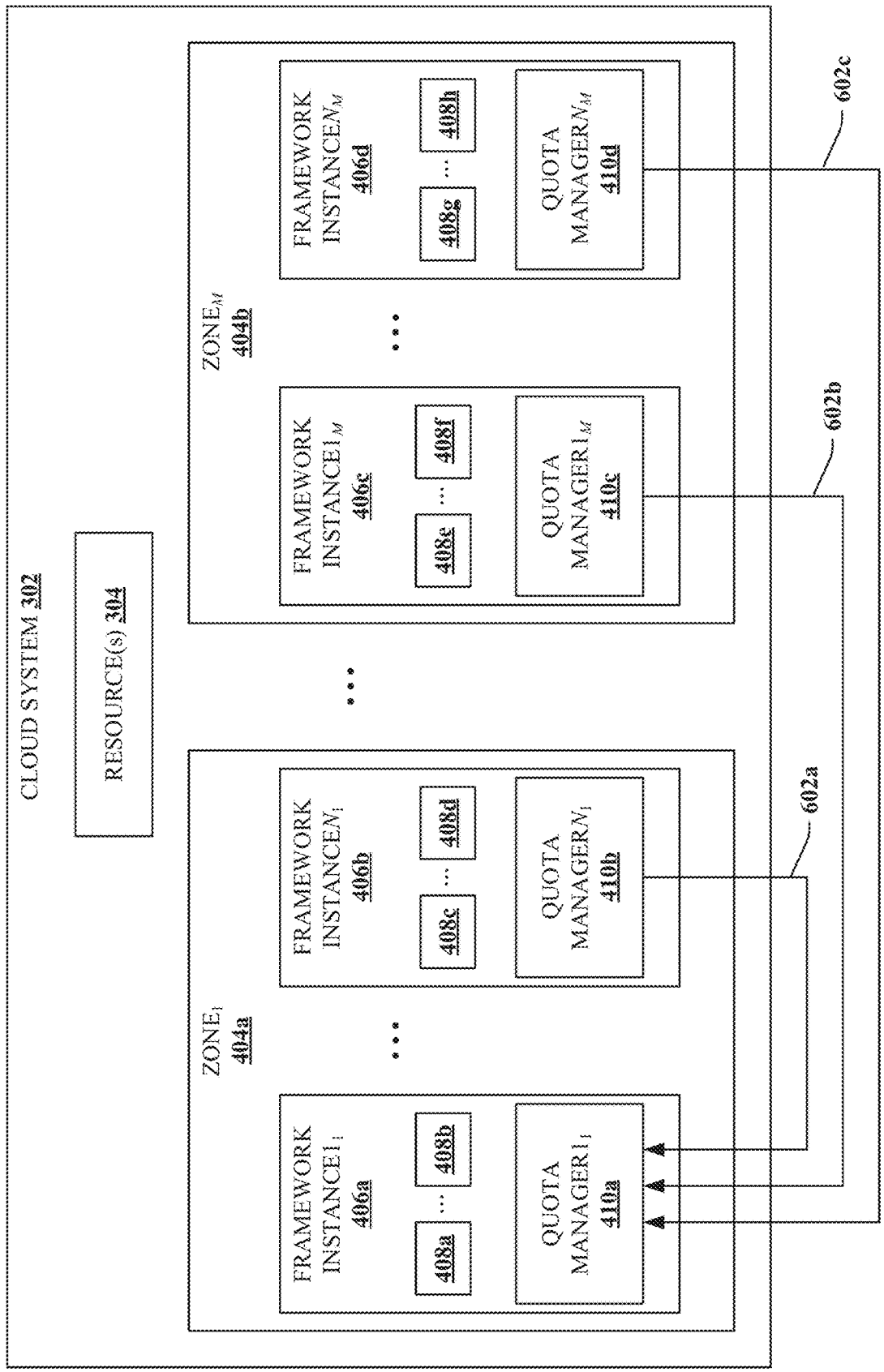
Figure 7:
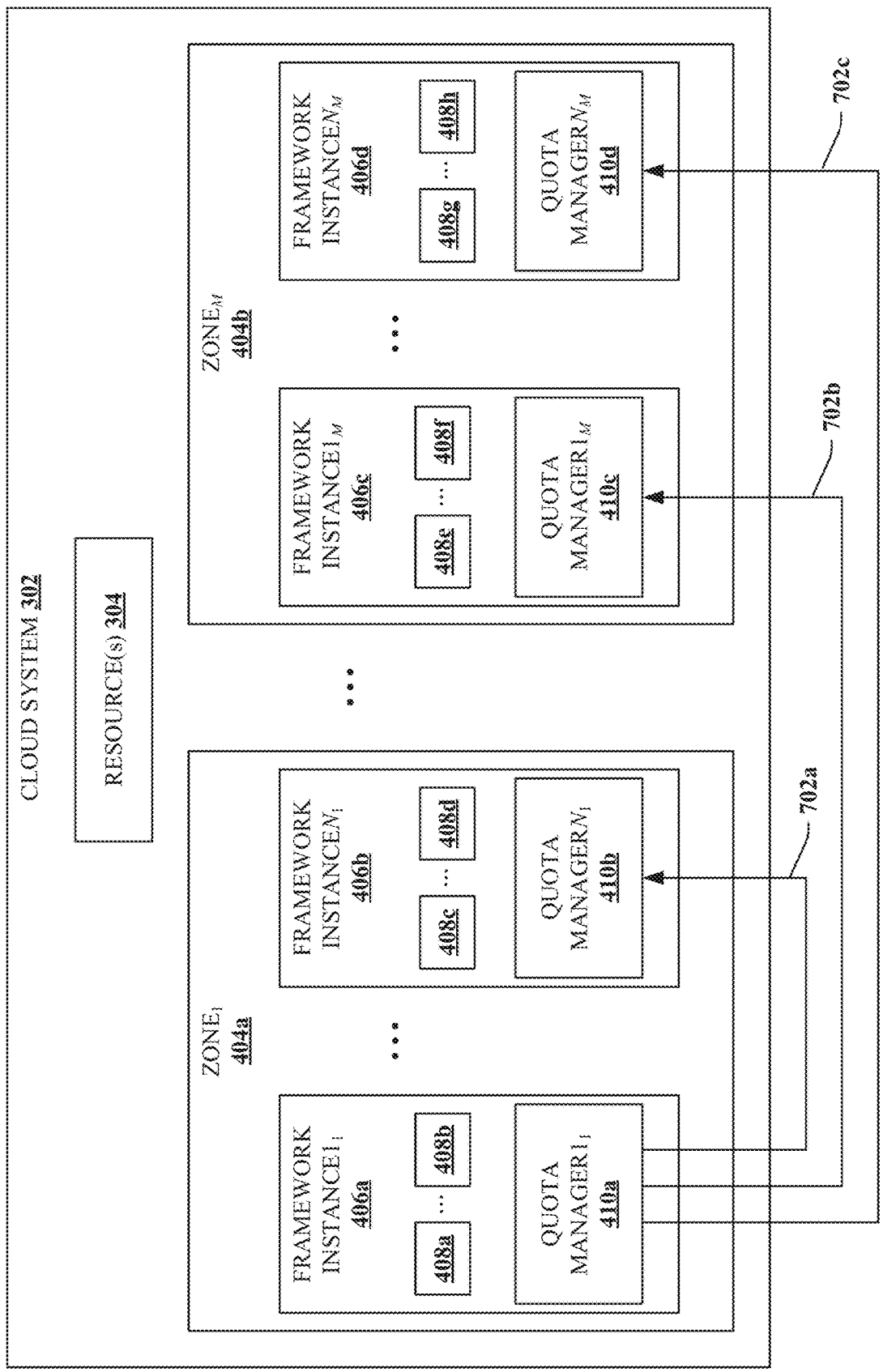

FIGS. 5, 6, and 7 illustrate block diagrams of example, non-limiting negotiations by a quota manager with the other quota managers to potentially re-allocate respective portions of their associated other framework instance sub-quotas to the framework instance associated with the quota manager in accordance with one or more embodiments described herein.

In this non-limiting example, quota manager$1_1$ 410a (e.g., requestor quota manager) can determine that usage$1_1$ meets threshold$1_1$ and initiate negotiation with the other quota managers (e.g., requestee quota manager), for example . . . quota manager$N_1$ 410b . . . quota manager$N_M$ 410d. Quota manager$1_1$ 410a can determine requestor information, which in a non-limiting example can include a requested quota amount, a priority(ies) of an application component instance(s) for which the requested quota amount is needed, a weight of the framework instance (e.g., framework instance$1_1$ 406a) associated with the requestor quota manager, a requestor consumption pattern of the resource by the framework instance associated with the requestor quota manager during a defined period of time (e.g., a defined most recent period of time or any other suitable period of time), or any other suitable information that a requestor quota manager can provide to a requestee quota manager. Requestor quota manager can include the requestor information along with a request for requestee information in respective inquiry request messages (e.g., inquiry request messages 502a, 502b, and 502c) transmitted to requestee quota managers.

In response to receiving the respective inquiry request messages, requestee quota managers (e.g., ... quota manager$N_1$ 410b ... quota manager$N_M$ 410d) can determine their respective requestee information, which in a non-limiting example can include an offered quota amount (e.g., an unused amount of sub-quota, an amount of sub-quota that the requestee quota manager is willing to reallocate (e.g., release), a predicted amount of sub-quota that the requestor quota manager will need in a defined future period of time, or any other suitable amount of sub-quota that the requestee quota manager can to reallocate), a priority(ies) of an application component instance(s) associated with the framework instance associated with the requestee quota manager that is employing the resource, a weight of the framework instance associated with the requestee quota manager, a requestee consumption pattern of the resource by the framework instance associated with the requestee quota manager during a defined period of time (e.g., a defined most recent period of time or any other suitable period of time), or any other suitable information that a requestee quota manager can provide to a requestor quota manager. It is to be appreciated that the offered quota amount can be zero if the requestee quota manager has determined that it should not reallocate quota to the requestor quota manager, such as in a non-limiting example, based on priority(ies) and/or weight in the requestee information versus the priority(ies) and/or weight in the requestor information, the unused amount of sub-quota is insufficient for reallocation, or any other suitable reason. The requestee quota managers can include that determined requestee information in respective update messages (e.g., update message 602a, 602b, and 602c as depicted in FIG. 6) transmitted to requestor quota manager.

In response to receiving the respective update messages, requestor quota manager can employ the requestor information and/or requestee information using any suitable algorithm to determine respective requestor estimated values of the offered quota amounts in the update messages. In a non-limiting example, the algorithm can employ priorities, weights, consumption patterns, requested quota amount, offered quota amounts, or any other suitable information. In an example, the requestor estimated value can be a representation of the value (e.g. cost) of the offered quota amount to the requestee quota manager, requestor quota manager, tenant, and/or cloud system 302, and/or any other suitable representation of value. For example, the value can represent an impact to a service the tenant offers to clients, a risk associated with cloud system 302, a value of an application instance and/or application component instance that will be terminated to reallocate the offered quota amount, or any other suitable value measure. Additionally, the requestee information can include a requestee estimated value of the offered quota amount, which can also be employed by the algorithm to determine the requestor estimated value of the offered quota amount. The algorithm can be defined by the tenant, the cloud system 302, and/or any other suitable entity.

Requestor quota manager can select one or more offered quota amounts that in total meet at least the requested quota amount according to one or more selection criteria. In a non-limiting example, a selection criterion can be a lowest requestor estimated value. For example, requestor quota manager can select the one or more offered quota amounts that have the lowest requestor estimated values. Any suitable selection criterion can be employed, and the selection criterion can be defined by the tenant, the cloud system 302, and/or any other suitable entity. Requestor quota manager can send respective hard and/or soft allocation requests (e.g., one or more of allocation requests 702a, 702b, and/or 702c as depicted in FIG. 7) to one or more requestee quota managers. For example, a hard allocation request can include a firm instruction for the requestee quota manager to reallocate the offered quota amount to the requestor quota manager that the requestee quota manager cannot decline. For example, requestor quota manager can send respective hard allocation requests to requestee quota managers associated with the selected one or more offered quota amounts. In another example, a soft allocation request can include an optional instruction for the requestee quota manager to reallocate the offered quota amount to the requestor quota manager that the requestee quota manager can accept or decline. Also, for a soft allocation request, the requestee quota manager can reallocate a different amount, for example, more or less than the offered quota amount. In an example, a requestee quota manager can decline the optional instruction or reallocate a different amount if its requestee information has changed, such as having a different unused amount, different application component instance(s) employing the resource, different requestee consumption pattern of the resource, or any other suitable changes. For example, requestor quota manager can send respective soft allocation requests to one or more requestee quota managers associated with one or more offered quota amounts that were not selected for hard requests. It is to be appreciated that requestee quota managers can send respective response messages (not shown) providing confirmation of reallocated quota amounts to requestor quota manager or denial of reallocation in response to receiving the respective hard and/or soft allocation request messages.

Requestor quota manager can add the one or more reallocated quota amounts to the sub-quota associated with the framework instance associated with the requestor quota manager. Requestee quota managers can reduce respective sub quotas associated with the framework instances associated with the requestee quota managers by the one or more respective reallocated quota amounts.

In another example, a tenant quota can increase or decrease which can cause changes in sub-quotas associated with framework instances and/or changes in thresholds associated with the framework instances, which can result in initiation of negotiations for reallocations of sub-quotas by one or more quota managers associated with the framework instances. In a non-limiting example, a tenant may reduce their quota of a resource, such as to reduce cost. In another non-limiting example, a tenant may increase their quota, such as to provide better performance of their application 306. For example, cloud system 302 can instruct the quota managers to adjust their associated sub-quotas based in the tenant quota increase or decrease. In a non-limiting example, if a quota manager cannot reduce its associated sub-quota, the quota manager can initiate negotiations for reallocations of sub-quotas by one or more other quota managers.

While FIGS. 1, 2, 3, 4, 5, 6, and 7 depict separate components in application 306 and cloud system 302 it is to be appreciated that two or more components can be implemented in a common component. Further, it is to be appreciated that the design of application 306 and cloud system 302 can include other component selections, component placements, etc., to facilitate automatically managing quota of a resource in cloud system 302 in accordance with one or more embodiments described herein. Moreover, the aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components can be combined into a single component providing aggregate functionality. The components can also interact with one or more other components not specifically described herein for the sake of brevity, but known by those of skill in the art.

Further, some of the processes performed may be performed by specialized computers for carrying out defined tasks related to automatically managing quota of a resource in a cloud system. The subject computer processing systems, methods apparatuses and/or computer program products can be employed to solve new problems that arise through advancements in technology, computer networks, the Internet and the like. The subject computer processing systems, methods apparatuses and/or computer program products can provide technical improvements to systems automatically managing quota of a resource in a cloud system by reducing communication, reducing processing requirements, reducing network bandwidth requirements, reducing memory requirements, reducing storage requirements, improving processing efficiency among processing components in these systems, reducing delay in processing performed by the processing components, and/or improving the accuracy in which the processing systems automatically manage quota of a resource in a cloud system.

It is to be appreciated that the any algorithms and/or criteria disclosed herein can be pre-defined, operator specified, and/or dynamically determined, for example, based on learning algorithms.

The embodiments of devices described herein can employ artificial intelligence (AI) to facilitate automating one or more features described herein. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine states of the system, environment, etc. from a set of observations as captured via events and/or data. Determinations can be employed to identify a specific context or action, or can generate a probability distribution over states, for example. The determinations can be probabilistic—that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, etc.)) schemes and/or systems (e.g., support vector machines, neural networks, expert systems, Bayesian belief networks, fuzzy logic, data fusion engines, etc.) in connection with performing automatic and/or determined action in connection with the claimed subject matter. Thus, classification schemes and/or systems can be used to automatically learn and perform a number of functions, actions, and/or determination.

A classifier can map an input attribute vector, $z=(z1, z2, z3, z4, zn)$, to a confidence that the input belongs to a class, as by $f(z)=$confidence(class). Such classification can employ a probabilistic and/or statistical-based analysis (e.g., factoring into the analysis utilities and costs) to determinate an action to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence can be employed. Classification as used herein also is inclusive of statistical regression that is utilized to develop models of priority.

Figure 8:
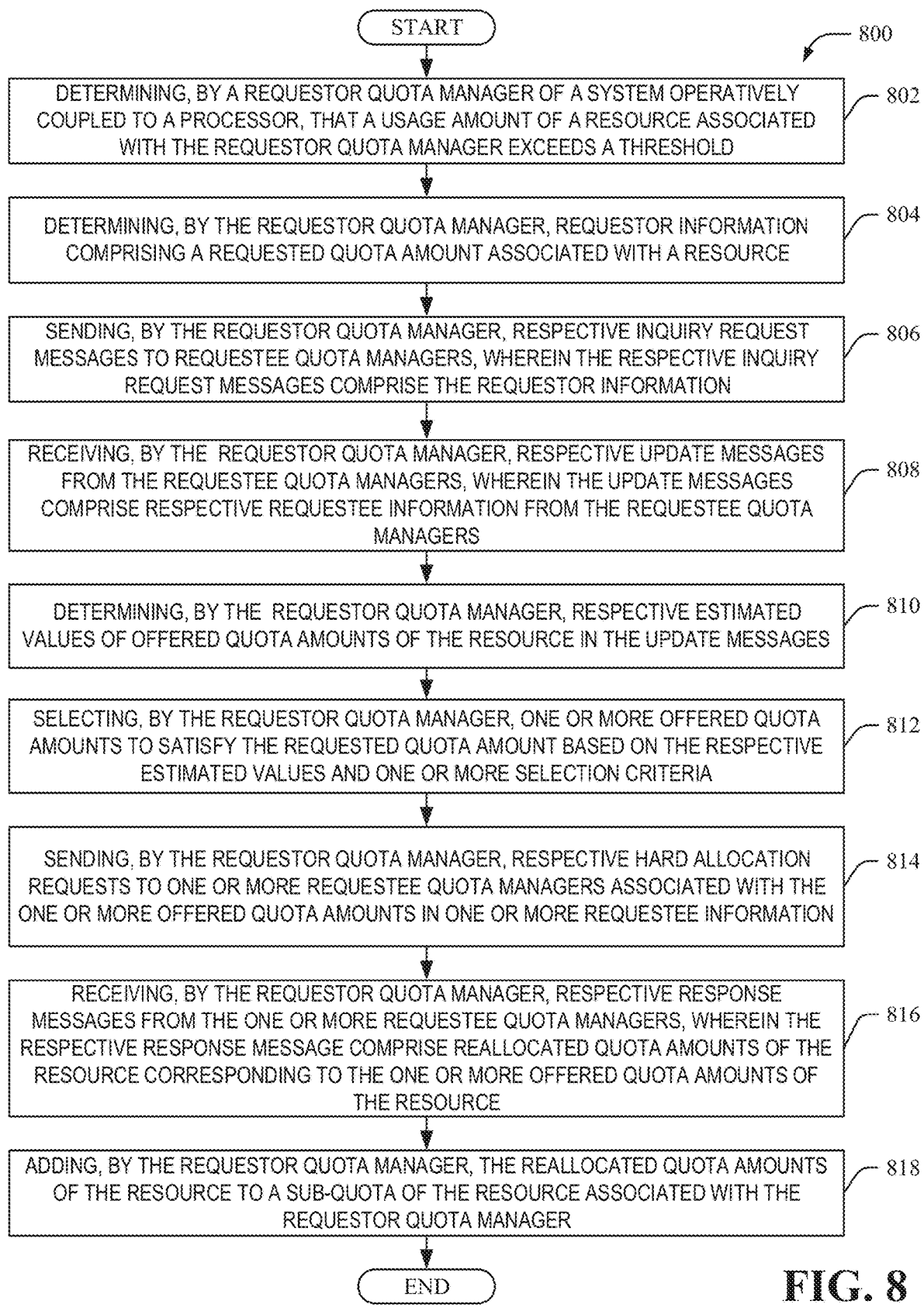
FIG. 8 illustrates a flow diagram of an example, non-limiting computer-implemented method that facilitates a requestor quota manager negotiating with requestee quota managers for reallocation of quota of a resource in accordance with one or more embodiments described herein.

FIG. 8 illustrates a flow diagram of an example, non-limiting computer-implemented method 800 that facilitates a requestor quota manager negotiating with requestee quota managers for reallocation of quota of a resource in accordance with one or more embodiments described herein. Repetitive description of like elements employed in other embodiments described herein is omitted for sake of brevity.

At 802, a determination is made, by a requestor quota manager of a system including a processor, that a usage amount of a resource associated with the requestor quota manager exceeds a threshold (e.g., via quota manager$1_1$ 410a quota manager$N_M$ 410d, framework instance$1_1$ 406a . . . framework instance$N_M$ 406d, application component instances 408a . . . 408h, and/or cloud system 302). At 804, requestor information is determined, by the requestor quota manager, comprising a requested quota amount associated with a resource (e.g., via quota manager$1_1$ 410a . . . quota manager$N_M$ 410d, framework instance$1_1$ 406a . . . framework instance$N_M$ 406d, application component instances 408a . . . 408h, and/or cloud system 302). At 806, respective inquiry request messages are sent, by the requestor quota manager, to requestee quota managers, wherein the respective inquiry request messages comprise the requestor information (e.g., via quota manager$1_1$ 410a . . . quota manager$N_M$ 410d, framework instance$1_1$ 406a . . . framework instance$N_M$ 406d, application component instances 408a . . . 408h, and/or cloud system 302). At 808, respective update messages are received, by the requestor quota manager, from the requestee quota managers, wherein the update messages comprise respective requestee information from the requestee quota managers (e.g., via quota manager$1_1$ 410a . . . quota manager$N_M$ 410d, framework instance$1_1$ 406a . . . framework instance$N_M$ 406d, application component instances 408a . . . 408h, and/or cloud system 302). At 810, respective estimated values are determined, by the requestor quota manager, of offered quota amounts of the resource in the update messages (e.g., via quota manager$1_1$ 410a . . . quota managerN$_M$ 410d, framework instance$1_1$ 406a . . . framework instanceN$_M$ 406d, application component instances 408a . . . 408h, and/or cloud system 302). At 812, one or more offered quota amounts of the resource are selected, by the requestor quota manager, to satisfy the requested quota amount based on the respective estimated values and one or more selection criteria (e.g., via quota manager$1_1$ 410a . . . quota managerN$_M$ 410d, framework instance$1_1$ 406a . . . framework instanceN$_M$ 406d, application component instances 408a . . . 408h, and/or cloud system 302). At 814, respective hard allocation requests sent, by the requestor quota manager, to one or more requestee quota managers associated with the one or more offered quota amounts in one or more requestee information (e.g., via quota manager$1_1$ 410a . . . quota managerN$_M$ 410d, framework instance$1_1$ 406a . . . framework instanceN$_M$ 406d, application component instances 408a . . . 408h, and/or cloud system 302). At 816, respective response messages are received, by the requestor quota manager, from the one or more requestee quota managers, wherein the respective response message comprise reallocated quota amounts of the resource corresponding to the one or more offered quota amounts of the resource (e.g., via quota manager$1_1$ 410a . . . quota managerN$_M$ 410d, framework instance$1_1$ 406a . . . framework instanceN$_M$ 406d, application component instances 408a . . . 408h, and/or cloud system 302). At 818, the reallocated quota amounts of the resource are added, by the requestor quota manager, to a sub-quota of the resource associated with the requestor quota manager (e.g., via quota manager$1_1$ 410a . . . quota managerN$_M$ 410d, framework instance$1_1$ 406a . . . framework instanceN$_M$ 406d, application component instances 408a . . . 408h, and/or cloud system 302).

Figure 9:
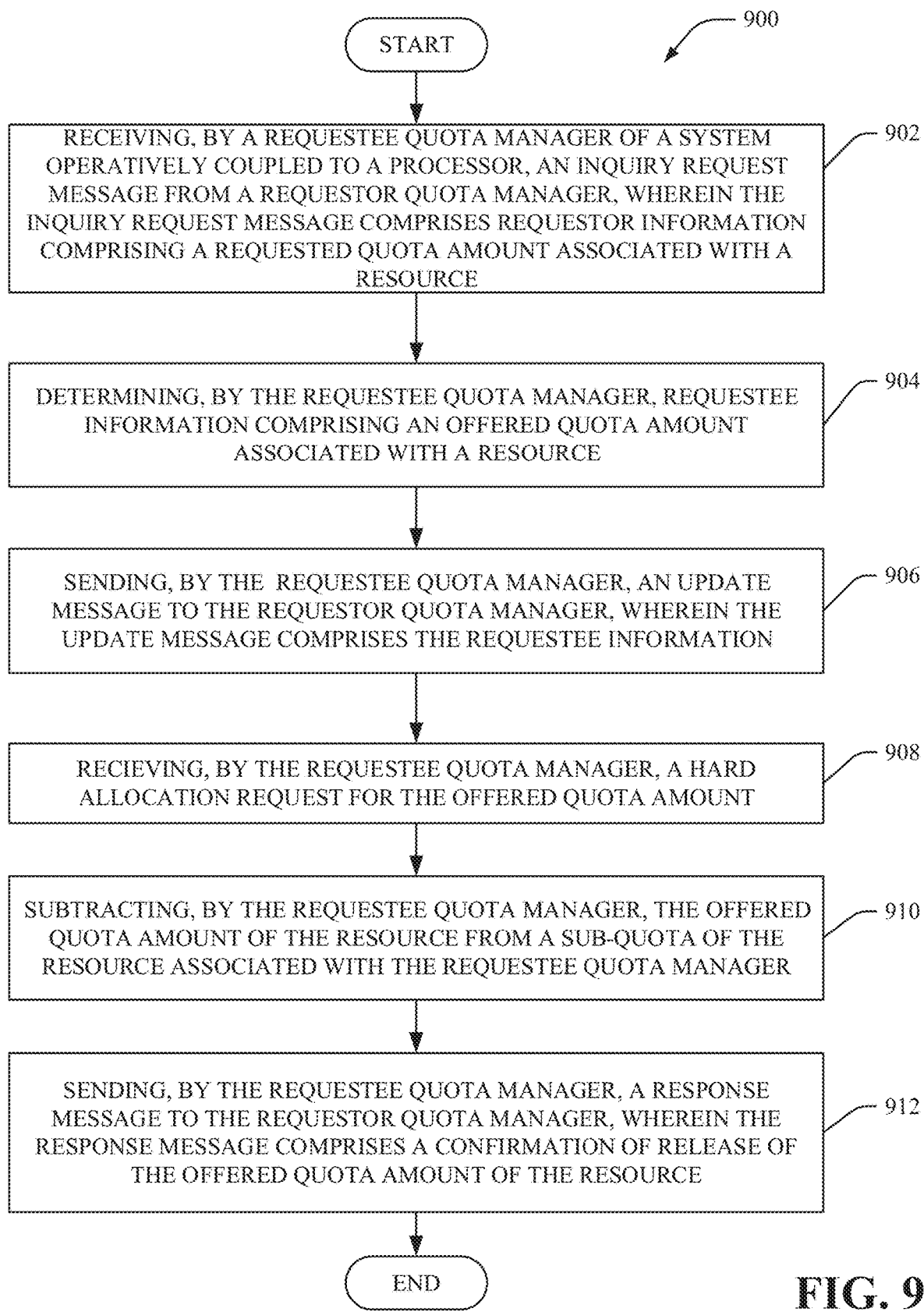
FIG. 9 illustrates a flow diagram of an example, non-limiting computer-implemented method that facilitates a requestee quota manager negotiating with a requestor quota manager for reallocation of quota of a resource in accordance with one or more embodiments described herein.

FIG. 9 illustrates a flow diagram of an example, non-limiting computer-implemented method 900 that facilitates a requestee quota manager negotiating with a requestor quota manager for reallocation of quota of a resource in accordance with one or more embodiments described herein.

At 902, an inquiry request message is received, by a requestee quota manager of a system including a processor, from a requestor quota manager, wherein the inquiry request message comprises requestor information comprising a requested quota amount associated with a resource (e.g., via quota manager$1_1$ 410a . . . quota managerN$_M$ 410d, framework instance$1_1$ 406a . . . framework instanceN$_M$ 406d, application component instances 408a . . . 408h, and/or cloud system 302). At 904, requestee information is determined, by the requestee quota manager, comprising an offered quota amount associated with a resource (e.g., via quota manager$1_1$ 410a . . . quota managerN$_M$ 410d, framework instance$1_1$ 406a . . . framework instanceN$_M$ 406d, application component instances 408a . . . 408h, and/or cloud system 302). At 906, an update messages is sent, by the requestee quota manager, to the requestor quota manager, wherein the update message comprises the requestee information (e.g., via quota manager$1_1$ 410a . . . quota managerN$_M$ 410d, framework instance$1_1$ 406a . . . framework instanceN$_M$ 406d, application component instances 408a . . . 408h, and/or cloud system 302). At 908, a hard allocation request is received, by the requestee quota manager, for the offered quota amount (e.g., via quota manager$1_1$ 410a . . . quota managerN$_M$ 410d, framework instance$1_1$ 406a . . . framework instanceN$_M$ 406d, application component instances 408a . . . 408h, and/or cloud system 302). At 910, the offered quota amount of the resource is subtracted, by the requestee quota manager, from a sub-quota of the resource associated with the requestee quota manager (e.g., via quota manager$1_1$ 410a . . . quota managerN$_M$ 410d, framework instance$1_1$ 406a . . . framework instanceN$_M$ 406d, application component instances 408a . . . 408h, and/or cloud system 302). At 912, a response message is sent, by the requestee quota manager, to the requestor quota manager, wherein the response message comprises a confirmation of release of the offered quota amount of the resource (e.g., via quota manager$1_1$ 410a . . . quota managerN$_M$ 410d, framework instance$1_1$ 406a . . . framework instanceN$_M$ 406d, application component instances 408a . . . 408h, and/or cloud system 302).

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 10:
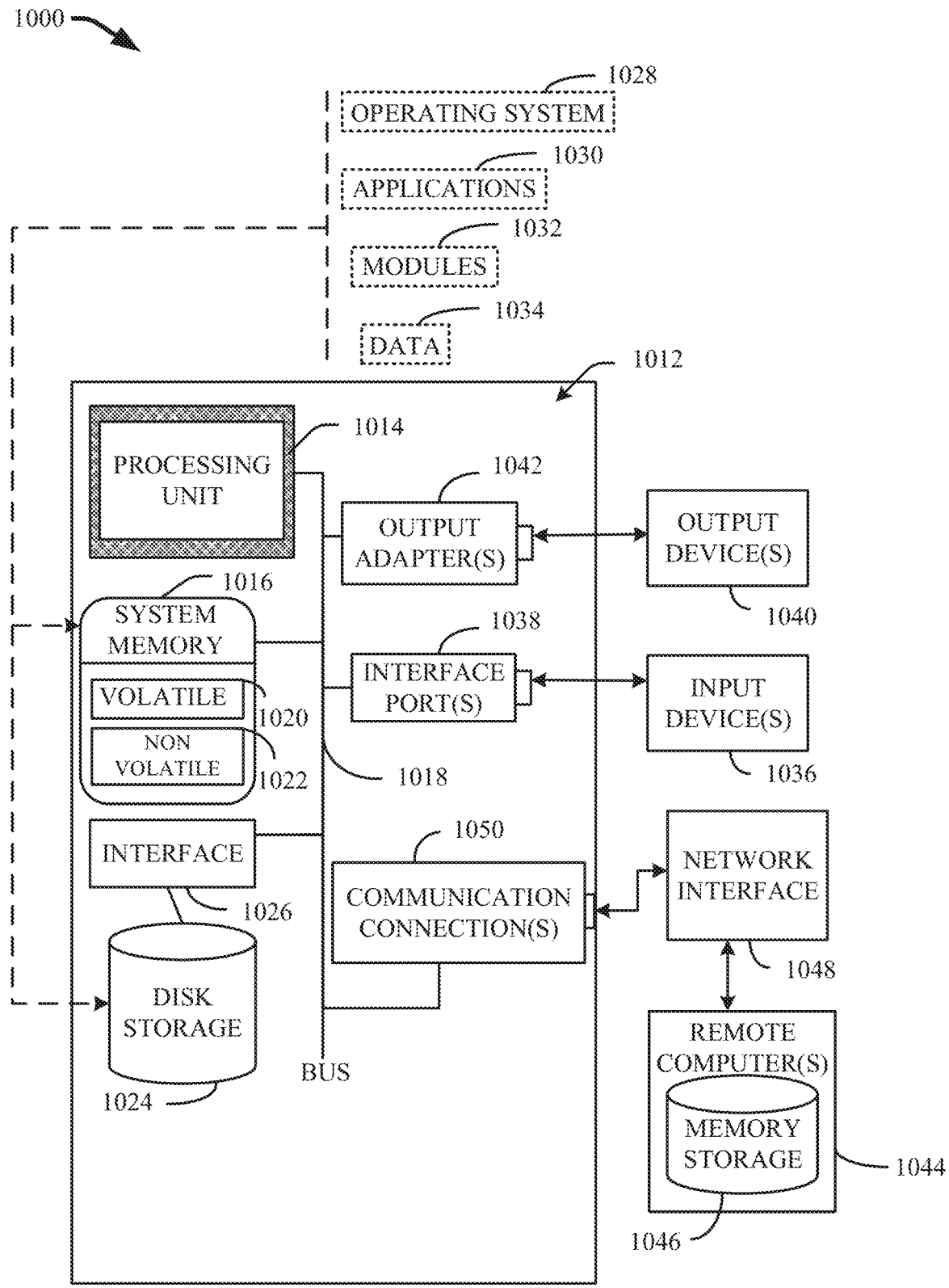
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is omitted for sake of brevity.

With reference to FIG. 10, a suitable operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1094), and Small Computer Systems Interface (SCSI). The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1020 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1000. Such software can also include, for example, an operating system 1028. Operating system 1028, which can be stored on disk storage 1024, acts to control and allocate resources of the computer 1012. System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

Embodiments of the present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a server computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer executable components;
   a processor that executes computer executable components stored in the memory, wherein the computer executable components comprise:
      a requestee quota manager configured to:
         determine requestee information comprising an offered quota amount associated with a resource in response to an inquiry request message from a requestor quota manager, wherein the inquiry request message comprises requestor information comprising a requested quota amount associated with the resource;
         send an update message to the requestor quota manager, wherein the update message comprises the requestee information; and
         receive a hard allocation request comprising a command for the requestee quota manager to reallocate the offered quota amount to the requestor quota manager.

2. The system of claim 1, wherein the requestee quota manager is further configured to subtract the offered quota amount of the resource from a sub-quota of the resource associated with the requestee quota manager.

3. The system of claim 1, wherein the requestee quota manager is further configured to send a response message to the requestor quota manager, wherein the response message comprises a reallocated quota amount of the resource corresponding to the offered quota amount of the resource, which reduces processing associated with communication in the shared computing system.

4. The system of claim 1, wherein the requestor information further specifies respective priorities assigned to one or more application instances for which the requested quota amount is needed.

5. The system of claim 1, wherein the requestor quota manager is assigned a quota of the resource, and the requestor information further specifies a weight assigned to a framework instance that has used a threshold amount of a sub-quota of the quota assigned to the first framework instance.

6. The system of claim 1, wherein the requestor information further specifies a consumption pattern of the resource by a first framework instance associated with the requestor quota manager over a defined period of time.

7. The system of claim 1, wherein the requestee information further specifies at least one parameter selected from the group consisting of an unused amount of sub-quota associated with a requestee quota manager associated with the request information, respective priorities assigned to one or more application instances employing the resource associated with a framework instance associated with the requestee quota manager, and a consumption pattern of the resource by the framework instance over a defined period of time.

8. The system of claim 1, wherein the system is a multi-tenant cloud computing system.

9. A computer-implemented method, comprising:
   determining, by a requestee quota manager of a system operatively coupled to a processor, requestee information comprising an offered quota amount associated with a resource in response to an inquiry request message from a requestor quota manager, wherein the inquiry request message comprises requestor information comprising a requested quota amount associated with the resource;
   sending, by the requestee quota manager, an update message to the requestor quota manager, wherein the update message comprises the requestee information; and
   receiving, by the requestee quota manager, a hard allocation request comprising a command for the requestee quota manager to reallocate the offered quota amount to the requestor quota manager.

10. The computer-implemented method of claim 9, wherein the requestee quota manager is further configured to subtract the offered quota amount of the resource from a sub-quota of the resource associated with the requestee quota manager.

11. The computer-implemented method of claim 9, wherein the requestee quota manager is further configured to send a response message to the requestor quota manager, wherein the response message comprises a reallocated quota amount of the resource corresponding to the offered quota amount of the resource, which reduces processing associated with communication in the shared computing system.

12. The computer-implemented method of claim 9, wherein the requestor information further specifies respective priorities assigned to one or more application instances for which the requested quota amount is needed.

13. The computer-implemented method of claim 9, wherein the requestor quota manager is assigned a quota of the resource, and the requestor information further specifies a weight assigned to a framework instance that has used a threshold amount of a sub-quota of the quota assigned to the first framework instance.

14. The computer-implemented method of claim 9, wherein the requestor information further specifies a consumption pattern of the resource by a first framework instance associated with the requestor quota manager over a defined period of time.

15. A computer program product for managing quota of a resource for a tenant of a shared computing system, the computer program product comprising a computer readable storage medium having program instructions embodied therewith, the program instructions executable by a processing component to cause the processing component to:
   determine, by the requestee quota manager, requestee information comprising an offered quota amount associated with a resource in response to an inquiry request message from a requestor quota manager, wherein the inquiry request message comprises requestor information comprising a requested quota amount associated with the resource;
   send, by the requestee quota manager, an update message to the requestor quota manager, wherein the update message comprises the requestee information; and
   receive, by the requestee quota manager, a hard allocation request comprising a command for the requestee quota manager to reallocate the offered quota amount to the requestor quota manager.

16. The computer program product of claim 15, wherein the program instructions executable by the processing component further cause the processing component to subtract, via the requestee quota manager, the offered quota amount of the resource from a sub-quota of the resource associated with the requestee quota manager.

17. The computer program product of claim 15, wherein the program instructions executable by the processing component further cause the processing component to send, via the requestee quota manager, a response message to the requestor quota manager, wherein the response message comprises a reallocated quota amount of the resource corresponding to the offered quota amount of the resource, which reduces processing associated with communication in the shared computing system.

18. The computer program product of claim 15, wherein the program instructions executable by the processing component further cause the processing component to:
   determine, via the requestee quota manager, a requestee estimated value of the offered quota amount of the resource; and
   include, via the requestee quota manager, the requestee estimated value of the offered quota amount of the resource in the requestee information.

19. The computer program product of claim 15, wherein the requestee quota manager is associated with a first framework instance of the shared computing system, and the requestor quota manager is associated with a second framework instance of the shared computing system.

20. The computer program product of claim 15, wherein the requestor information further specifies respective priorities assigned to one or more application instances for which the requested quota amount is needed.

* * * * *